United States Patent [19]
Birle

[11] 3,881,890

[45] May 6, 1975

[54] ABRASIVE BORON NITRIDE PARTICLES CONTAINING PHOSPHORUS

[75] Inventor: John David Birle, Galloway, Ohio

[73] Assignee: General Electric Company, Columbus, Ohio

[22] Filed: Apr. 20, 1973

[21] Appl. No.: 352,884

[52] U.S. Cl. .................. 51/307; 51/298; 51/308; 51/309; 117/100 B
[51] Int. Cl. ..................... B24d 3/14; B24d 3/28
[58] Field of Search ...... 423/284, 290, 276; 51/307, 51/308, 309, 298; 106/55, 39.5; 117/100

[56] References Cited
UNITED STATES PATENTS

| | | | |
|---|---|---|---|
| 2,947,617 | 8/1960 | Wentorf | 51/307 |
| 3,036,907 | 5/1962 | Bibbins | 51/309 |
| 3,150,929 | 9/1964 | Wentorf | 51/307 |
| 3,192,015 | 6/1965 | Wentorf | 51/307 |
| 3,233,988 | 2/1966 | Wentorf | 51/307 |

*Primary Examiner*—Donald J. Arnold

[57] ABSTRACT

A tough cubic boron nitride crystal having greater-than-usual impact resistance is prepared by effecting the catalytic transformation of soft hexagonal boron nitride into cubic boron nitride in the presence of sufficient phosphorus or phosphorus-containing compound to substantially saturate the abrasive crystal with about 0.042 percent by weight of phosphorus.

8 Claims, No Drawings

ABRASIVE BORON NITRIDE PARTICLES CONTAINING PHOSPHORUS

BACKGROUND OF THE INVENTION

Boron nitride is known in a soft form and in two hard forms. The soft form is a hexagonal crystal which is analagous to graphite and is useful as a lubricant. In the hard form, particles of the material possess a hardness aproaching that of diamond. Grinding wheels utilizing abrasive boron nitride are superior to grinding wheels using diamond particles or other abrasives when used to grind hard tool steels.

Neither of the hard abrasive types of boron nitride has been found in nature. The transformation of the soft hexagonal form into a hard form having a cubic crystalline configuration corresponding to the atomic crystal configuration of zincblende was disclosed in Wentorf U.S. Pat. No. 2,947,617. The transformation of the soft form of boron nitride to a hard hexagonal crystalline form having an atomic crystal structure corresponding to wurtzite was disclosed in Bundy et al. U.S. Pat. No. 3,212,851. The present invention applies only to cubic boron nitride of the zincblende structure prepared by catalytic transformation from the soft form of hexagonal boron nitride.

Wentorf's catalytic transformation used as catalyst materials alkaline metals, alkaline earth metals, lead, antimony, tin, and nitrides of all of these metals. The presence of one or more of these catalyst materials enables the transformation to take place in the cubic boron nitride stable region of the phase diagram at a point near the equilibrium line of such diagram.

During the production of cubic boron nitride a small quantity of catalyst material is trapped in the crystal structure. The residual quantity of catalyst material present in the crystal structure may be augmented by other materials present during the transformation. For example, graphite or carbon black may be added to the charge to provide cubic boron nitride crystals containing carbon paticles. Such particles enhance the abrasive quality of the final crystal. Other additives or dopants may be included in the intital charge to produce a final abrasive particle containing such additives or dopants. The use of beryllium as a dopant to make cubic boron nitride electrically conducting is disclosed in Wentorf U.S. Pat. No. 3,078,232. The use of silicon and germanium for this purpose is disclosed in Wentorf U.S. Pat. No. 3,141,802. The use of selenium and sulfur is disclosed in Wentrof U.S. Pat. No. 3,216,942.

SUMMARY OF THE INVENTION

In accordance with the present invention it has been discovered that cubic boron nitride crystals in which phosphorus is incorporated are not only very tough but also very regular crystals. When such crystals are incorporated as abrasive particles in vitreous-bond, metal bond, or resin-bond grinding wheels they give improved results in the grinding of hard tool steels.

DESCRIPTION OF THE PREFERRED EMBODIMENT

Two criteria for determining the usefulness of various cubic boron nitrides are (1) the particle size distribution produced by the formulation, and (2) the friability index. In determining the friability index, crystals of a given mesh size are subjected to repeated impact and the loss in size of the crystals due to fracture is then measured. Half-gram samples are used for this purpose. The friability index is the percentage of loss to the new smaller standard mesh size. Thus, the higher the friability index the weaker the crystal. Accordingly, it is desirable that the process used produce not only a crystal of low friability index but also crystals in the size ranges which are in greatest demand commerically.

When cubic boron nitride crystals are saturated with phosphorus, phosphorus is present to about 0.042 weight percent in the crystal. While lower proportions of phosphorus produce improved crystals the preferred form of practicing the invention is with phosphorus present at about the saturation point. Of course, a much higher percentage of phosphorus than 0.042 weight percent must be present in the initial charge in order to have a final product which is saturated with phosphorus. Preferably, the initial charge contains 0.5 to 7.0 weight percent phosphorus. In the practice of the invention the initial charge is subject to temperatures and pressures in the cubic-stable region of the cubic-hexagonal phase diagram for a period of 2 to 20 minutes and preferably for a period of 6 to 15 minutes.

Following usual procedure the phosphorus-containing charge is placed in the reaction chamber of a high-pressure high-temperature apparatus. The temperature is then raised to at least 1,200°C and the pressure to a level where cubic boron nitride is stable at the particular temperature to which the charge is subjected. This is usually a pressure in excess of 40 kilobars. The temperature is then allowed to fall by cutting off the heating circuit and then the pressure is reduced. The charge is then withdrawn from the apparatus and the cubic boron nitride particles separated from the charge matrix.

Not all phosphorus-containing formulations yield the same results. Many formulations give such a small yeild of cubic boron nitride as to make them usable commerically. The following examples 1 through 28 give the results of various phosphorus-containing formulations:

| Example No. | Composition (Weight Percentages) | Description of Crystals | % 80/140 Mesh In Yield | Friability of 100/120 Mesh |
| --- | --- | --- | --- | --- |
| 1 | 83.5% BN, 10% Li$_3$N, 3% LiH, 3% LiOH, .5% P$_3$N$_5$ | Yellow | 33 | 50 |
| 2 | 83% BN, 10% Li$_3$N, 3% LiH, 3% LiOH, 1.0% P$_3$N$_5$ | Yellow | 35 | 33 |
| 3 | 82% BN, 10% Li$_3$N, 3% LiH, 3% LiOH, 2.0% P$_3$N$_5$ | Yellow | 43 | 26 |
| 4 | 83% BN, 10% Li$_3$N, 3% LiH, 3% LiOH, 1.0% P* | Yellow | 51 | 36 |
| 5 | 82% BN, 10% Li$_3$N, 3% LiH, 3% LiOH, 2.0%P | Yellow | 46 | 27 |

| Example No. | Composition (Weight Percentages) | Description of Crystals | % 80/140 Mesh In Yield | Friability of 100/120 Mesh |
|---|---|---|---|---|
| 6 | 81% BN, 10% Li$_3$N, 3% LiH, 3% LiOH, 3.0% P | Yellow | 44 | 26 |
| 7 | 85% BN, 10% Li$_3$N, 2% NH$_4$Cl, 2% NH$_4$H$_2$PO$_4$, 1% P$_3$N$_5$ | Yellow, Very Small | — | — |
| 8 | 85% BN, 10% Li$_3$N, 3% NH$_4$Cl, 1.5% NH$_4$H$_2$PO$_4$, 0.5% P$_3$N$_5$ | Yellow, Very Small | — | — |
| 9 | 83.5% BN, 10% Li$_3$N, 4% NH$_4$Cl, 1.0% NH$_4$H$_2$PO$_4$, 1.5% P$_3$N$_5$ | Yellow | 46 | 30 |
| 10 | 84% BN, 10% Li$_3$N, 4% NH$_4$Cl, 1.0% NH$_4$H$_2$PO$_4$, 1.0% P$_3$N$_5$ | Yellow Very Small | — | — |
| 11 | 84% BN, 10% Li$_3$N, 2% NH$_4$Cl, 2% NH$_4$H$_2$PO$_4$, 2% P | Yellow Very Small | — | — |
| 12 | 80% BN, 10% Li$_3$N, 3% LiH 3% LiOH, 2% P, 2% NH$_4$H$_2$PO$_4$ | Yellow | 46 | 28 |
| 13 | 80% BN, 10% Li$_3$N, 3% LiH, 3% LiOH, 2% P, 2% (NH$_4$)$_2$CO$_3$ | Black and Yellow | 50 | 31 |
| 14 | 86% BN, 10% Li$_3$N, 2% P, 2% (NH$_4$)$_2$CO$_3$ | Black and Yellow | — | — |
| 15 | 80% BN, 10% Li$_3$N, 3% LiH, 3% LiOH, 2% NH$_4$BF$_4$, 2% P | Yellow | 42 | 31 |
| 16 | 80% BN, 10% Li$_3$N, 3% LiH, 3% LiOH, 2% P, 2% (NH$_4$)$_2$SO$_4$ | Yellow Very Small | — | — |
| 17 | 80% BN, 10% Li$_3$N, 3% LiH, 3% LiOH, 2% P, 2% NH$_4$F | Light Yellow | 50 | 29 |
| 18 | 83.5% BN, 10% Li$_3$N, 3% LiH, 3% LiOH, 0.5% P$_2$O$_5$ | Yellow | 47 | 48 |
| 19 | 83% BN, 10% Li$_3$N, 3% LiH, 3% LiOH, 1.0% P$_2$O$_5$ | Light Yellow | 50 | 34 |
| 20 | 82% BN, 10% Li$_3$N, 3% LiH, 3% LiOH, 2% P$_2$O$_5$ | Light Yellow | 53 | 34 |
| 21 | 81% BN, 10% Li$_3$N, 3% LiH, 3% LiOH, 3% P$_2$O$_5$ | Light Yellow, Small | — | — |
| 22 | 78% BN, 10% Li$_3$N, 3% LiH, 3% LiOH, 6% P$_2$O$_5$ | Light Yellow, Small | — | — |
| 23 | 82% BN, 10% Li$_3$N, 3% LiH, 3% LiOH, 2% BP | Black | 30 | 41.8 (120/140) |
| 24 | 80% BN, 10% Li$_3$N, 3% LiH, 3% LiOH, 2% P, 2% NH$_4$Cl | Yellow | 47 | 26 |
| 25 | 79% BN, 10% Li$_3$N, 3% LiH, 3% LiOH, 2% P, 3% NH$_4$Cl | Yellow | 49 | 34 |
| 26 | 78% BN, 10% Li$_3$N, 3% LiH, 3% LiOH, 2% P, 4% NH$_4$Cl | Yellow | 30 | 27 |
| 27 | 79% BN, 10% Li$_3$N, 3% LiH, 3% LiOH, 1% NH$_4$H$_2$PO$_4$, 4% NH$_4$Cl | Yellow | 36 | 38 |
| 28 | 81% BN, 10% Li$_3$N, 3% LiH, 3% LiOH, 3% NH$_4$Cl | Yellow | 24 (80/120) | 47 |

*C.P. Red Phosphorus

Example 24 was the best formulation as it gave a good yield of the desirable 80/140 material and had a friability index of 26 for the 100/120 material. In this example, lithium nitride was the catalyst and ammonium chloride functioned as a mineralizer.

The particle size distribution and friability of the material from Example 24 were as follows:

| Mesh Size | Weight % | Friability Index |
|---|---|---|
| +60 | 2.1 | — |
| 60/80 | 15.9 | 35.8 |
| 80/100 | 16.7 | 30.6 |
| 100/120 | 17.0 | 26.4 |
| 120/140 | 15.4 | 23.4 |
| 140/170 | 14.6 | 19.4 |
| 170/200 | 7.4 | 18.2 |
| 200/230 | 2.8 | — |
| 230/270 | 4.2 | — |
| 270/325 | 3.0 | — |
| 325/400 | 0.7 | — |
| −400 | 0.2 | — |

Phosphorus doping produces an extremely tough cubic boron nitride crystal having nearly perfect crystallinity. When such crystals were used as the abrasive particles in resin-bond wheels considerably improved results were achieved in certain comparison grinding tests. The following Table 1 compares dry grinding test results in resin-bond wheels using nickel-coated cubic boron nitride as the abrasive on T–15 steel. In the control (cubic boron nitride) wheels the cubic boron nitride contained about 1.0% by weight of carbon, an additive which considerably increases the toughness of the crystal. The wheels containing phosphours-doped cubic boron nitride used crystals which were saturated with phosphorus but contained no carbon.

TABLE 1

GRINDING RATIOS IN DRY GRINDING OF T-15 STEEL

| Nickel Coated Abrasive | Mesh Size | Infeed (Inches) | | | |
|---|---|---|---|---|---|
| | | .001 | .002 | .003 | .004 |
| Cubic boron nitride | 100/120 | 91 | 33 | 18 | 12 |
| Phosphorus-doped cubic boron nitride | 100/120 | 194 | 59 | 24 | 15 |
| Cubic boron nitride | 80/100 | 122 | 55 | 35 | 21 |
| Phosphorus-doped cubic boron nitride | 80/100 | 309 | 105 | 47 | 26 |

T–15 steel is an iron-base steel containing 12 weight percent tungsten, 5 weight percent vandium 4 weight percent chromium and 5 weight percent cobalt, and was hardended to $R_c$ 58–60.

The following Table III compares dry grinding test results in resin-bond wheels using nickel-coated cubic boron nitride as the abrasive on M–2 steel.

TABLE II

GRINDING RATIOS IN DRY GRINDING OF M-2 STEEL

| Nickel-Coated Abrasive | Mesh Size | Infeed (Inches) | | | |
|---|---|---|---|---|---|
| | | .001 | .002 | .003 | .004 |
| Cubic boron nitride | 100/120 | 233 | 40 | 16 | 10 |
| Phosphorus-doped cubic boron nitride | 100/120 | 329 | 46 | 19 | 9 |
| Cubic boron nitride | 80/100 | 199 | 54 | 34 | 17 |
| Phosphorus-doped cubic boron nitride | 80/100 | 422 | 74 | 31 | 19 |

M–2 steel is an iron-base steel containing about 4 weight percent chromium, 2 weight percent vanadium, 6 weight percent tungsten, and 5 weight percent molybdenum, and was hardened to $R_c$ 60–62.

It is here emphasized that the properties of abrasive particles which make them superior for some grinding applications make them inferior for others. For example, insome wet grinding applications resin bond wheels containing phosphorus-doped abrasive particles were inferior in grinding ratio to similar wheels in which the abrasive particles did not contain phosphorus. It appears that a low friability index is not in all cases a desirable property. Low friability and regularity of crystal structure go together. In some grinding applications the weaker crystals which can be more easily cleaved to expose a fresh cutting surface perform more effectively. Thus, the mere fact that a particular crystal has a high friability index does not mean that it cannot give superior performance in certain applications. Parameters such as the type of bond used, the percent of abrasive in the bond, the wheel speed, the wheel infeed, the table speed, the type of coolant, if any, used, and others enter into the performance equation. All of these together with the properties of the material to be ground must be taken into consideration in order to obtain optimum effectiveness in wheel performance.

While the invention has been described with reference to certain specific embodiments, it is obvious that there may be variations. Accordingly, the invention should be limited in scope only as may be necessitated by the scope of the appended claims.

What 1 claim as new and desired to secure by Letters Patent of the United States is:

1. Abrasive cubic boron nitride particles substantially saturated with about 0.042 weight percent of phosphorus.

2. An abrasive wheel in which the matrix contains cubic boron nitride particles as claimed in claim 1.

3. An abrasive wheel as claimed in claim 2 in which the matrix is a resin matrix.

4. An abrasive wheel as claimed in claim 3 in which the abrasive particles are nickel-coated.

5. An abrasive wheel as claimed in claim 2 in which the matrix is a vitreous matrix.

6. An abrasive wheel as claimed in claim 2 in which the matrix is a metal matrix.

7. The method of catalytically preparing boron nitride particles with substantially phosphorus-saturated cubic crystalline structure which comprises mixing soft hexagonal boron nitride with 0.5 to 7 weight percent of a member selected from the group consisting of phosphorus, a phosphorus compound, and mixtures thereof, subjecting the resulting mixtures to an elevated temperature of at least 1,200°C. and pressure conditions in excess of 40 kilobars, conditions under which the cubic crystalline boron nitride structure is stable, and sequentially reducing the temperature and lowering the pressure of said mixture.

8. The method of claim 7 wherein the mixture consists by weight of about 80% soft hexagonal boron nitride, 10% lithium nitride, 3% lithium hydride, 3% lithium hydroxide, 2% phosphorus and 2% ammonium chloride.

* * * * *